United States Patent [19]

Hasha

[11] 4,136,552

[45] Jan. 30, 1979

[54] LEAK TESTING METHOD AND APPARATUS FOR TUBULAR MEMBERS AND PACKER MEANS THEREFOR

[76] Inventor: Malvern M. Hasha, 5400 Memorial Dr., Ste. 813, Houston, Tex. 77007

[21] Appl. No.: 873,003

[22] Filed: Jan. 27, 1978

Related U.S. Application Data

[63] Continuation of Ser. No. 506,547, Sep. 16, 1974, which is a continuation-in-part of Ser. No. 467,133, May 6, 1974, abandoned.

[51] Int. Cl.² ............................................. G01M 3/04
[52] U.S. Cl. .......................................................... 73/46
[58] Field of Search ................ 73/46, 49.1, 49.5, 49.8, 73/40, 40.5 R

[56] References Cited

U.S. PATENT DOCUMENTS

| | | | |
|---|---|---|---|
| 2,761,311 | 9/1956 | Baker | 73/46 |
| 3,034,339 | 5/1962 | Gawlik | 73/46 |
| 3,921,437 | 11/1975 | Hauk | 73/46 X |
| 4,010,633 | 3/1977 | Hasha | 73/46 |

*Primary Examiner*—S. Clement Swisher
*Assistant Examiner*—Joseph W. Roskos

[57] ABSTRACT

A body having a longitudinal opening through which a tubular member may extend for testing, such as two tubular members connected together by threaded connections or a coupling. Positioned along the longitudinal opening in the body are longitudinally spaced annular seal means. The body includes passage means for conducting fluid pressure against the outer circumferential surface of each of the annular seal means. Back-up means are mounted in association with each annular seal means for inward and outward radial movement with such seal means, each of the back-up means comprising anti-extrusion means to prevent significant extrusion of the seal means responsive to pressure imposed thereon. Means on each of the back-up means and on the seal means coact to urge the back-up means into tighter frictional engagement with the tubular members upon the application of a continuing radial force to the seal means by the pressurized actuating fluid after the seal means are moved into sealing engagement with the tubular member. The application of the pressurized actuating fluid against the outer circumferential surface of the annular seal means forces the seal means and the back-up means carried thereby into engagement with the tubular member whereby the spaced annular seal means and the body form a closed chamber which seals the exterior of the tubular member. The body includes a further passageway for supplying a pressurized test fluid into the closed chamber for externally testing the tubular member.

3 Claims, 11 Drawing Figures

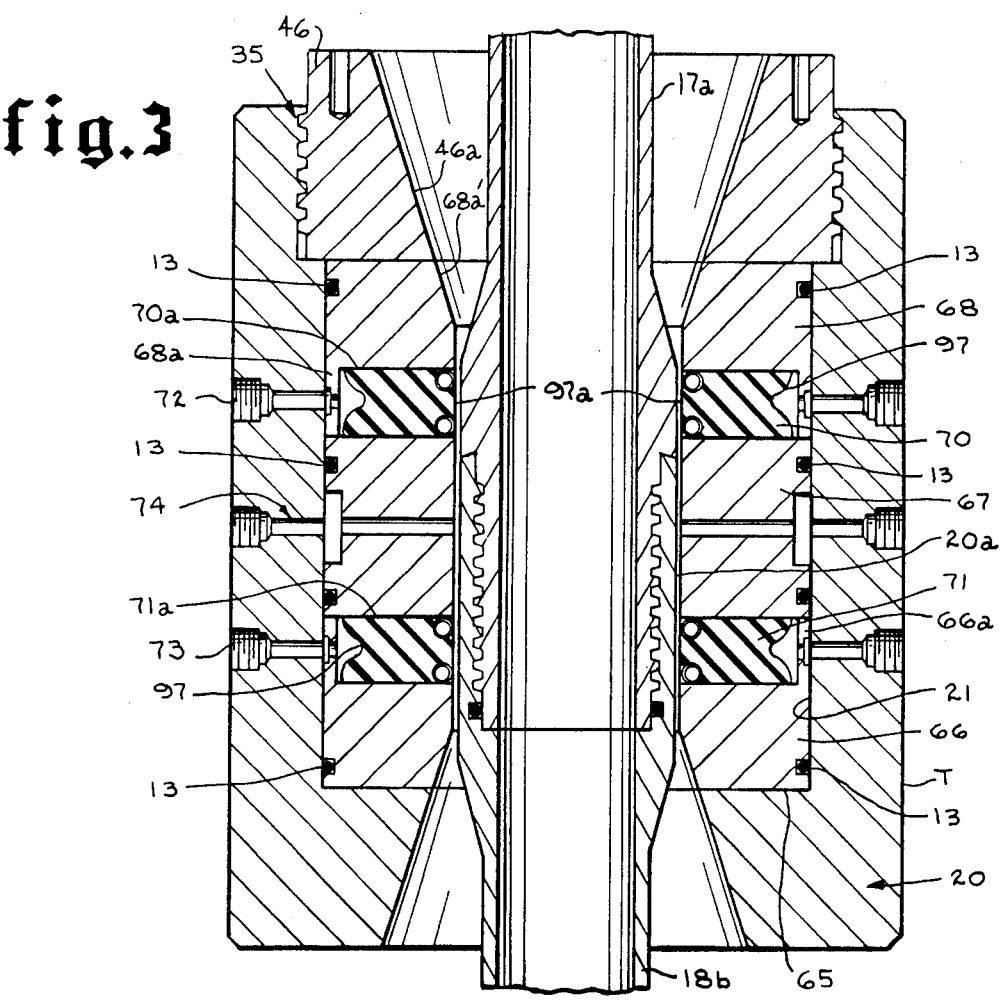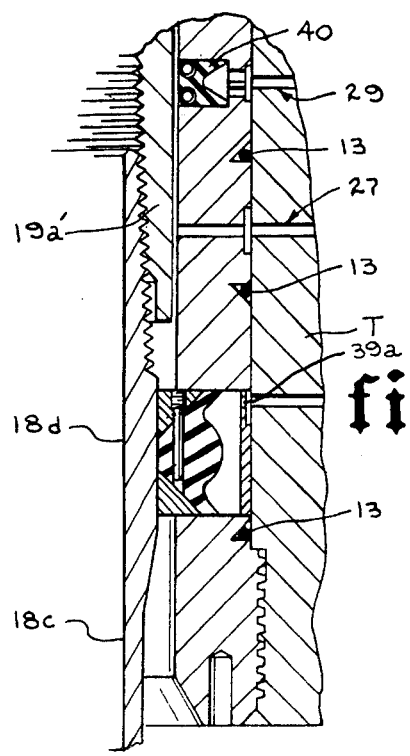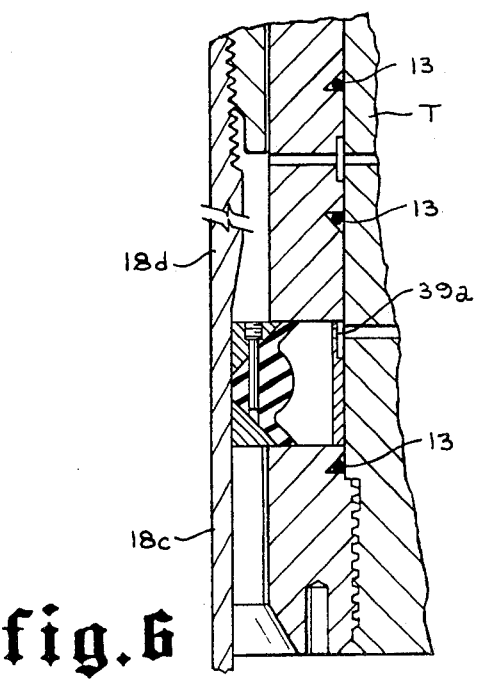

LEAK TESTING METHOD AND APPARATUS FOR TUBULAR MEMBERS AND PACKER MEANS THEREFOR

CROSS REFERENCE TO RELATED APPLICATIONS

This Application is a continuing application of my prior copending application Ser. No. 506,547 filed Sept. 16, 1974 for "Leak Testing Method and Apparatus For Tubular Members and Packer Means Therefor," which in turn is a continuation-in-part of my prior application Ser. No. 467,133 filed May 6, 1974 now abandoned for "Leak Testing Method And Apparatus For Tubular Members And Packer Means Therefor". This application is also related to my U.S. Pat. No. 4,010,633 issued May 8, 1977 from application Ser. No. 632,790 filed Nov. 17, 1965.

BACKGROUND AND OBJECTS OF THE INVENTION

Various types of methods and apparatus for externally testing tubular members have been heretofore provided, such as the methods and apparatus shown in U.S. Pat. Nos. 3,921,437; 3,371,521; 3,478,577; 3,358,497; 3,034,339; 2,587,192 and 2,761,311. In those devices which are split to wrap around the tubular members to perform an external test, the structure and arrangement of such external testers is bulky and valuable time may be lost in positioning the device about the pipe and the connection to perform the test and thereafter removing the device from the pipe so that the tubular members may be moved relative to the tester. This is particularly true where the device is employed in running tubulars such as production tubing, surface pipe or casing in an oil or gas well. In some instances, it is desirable to complete the test as quickly as possible and with a minimum of time lost in maintaining the pipe stationary to inhibit sticking of the pipe, or to inhibit other problems that may be encountered to those skilled in the art. In those devices heretofore contemplated for permanent positioning about tubular members during external testing thereof, the longitudinal extent of the devices and the manner in which the seals are actuated not only may render them difficult for use in that the position of the tongs relative to such longer bodies makes it awkward and difficult for the tongs to be readily manipulated by the tong operator but the volume of fluid externally of the connection may reduce the sensitivity and accuracy of the test. Such devices also do not necessarily provide a satisfactory construction for performing an external test on tubular members, particularly where the test is performed as the tubular members are being run into an oil or gas well, so as to form the seals externally about the connection, perform the test and then release the seals so that the pipe may be moved therethrough with a minimum of time lost and a minimum of effort. Such devices also have not necessarily provided the desired ability to seal completely and effectively in repetitive operations and to hold such seals under high pressures.

The present invention is directed to a method and structural arrangement of an external tester which may be maintained and positioned about the pipe when it is being run in or removed from an oil, gas or other type well to enable a seal to be formed around a connection to seal the connection off and externally test it for leaks, and thereafter disengage the seal from the tubular member to permit the tubular member to be moved longitudinally through the test unit and into or out of the well bore.

A further object of the present invention is to provide an external tester for testing connections between tubular members including a body having an opening extending longitudinally therethrough, such body having longitudinally spaced annular seal means therein with passage means in the body for conducting fluid to move the seal means radially away from the body and into the opening to seal about the tubular members and isolate the tubular member connection in a chamber between the seal means and additional fluid passage means for conducting fluid to the chamber between the seal members to externally test the connection between the tubular members for leaks.

A further object is to apply fluid pressure directly against annular seals to move them radially into sealing engagement with tubular members to seal off a connection between the tubular members even though the tubular members may be out-of-round, or may be slightly oversize or undersize relative to the standard normal diameter of the tubular members.

A further object of the present invention is to provide an external tester for testing connections between tubular members including a body having an opening extending longitudinally therethrough, such body having longitudinally spaced annular seal means therein with passage means in the body for conducting fluid to move the seal means radially of the body to seal about the tubular members and isolate the tubular member connection in a chamber between the seal means, the chamber being only slightly larger than the connection to form a chamber of minimum volume in the body, and additional fluid passage means for conducting fluid to the chamber between the seal members to externally test the connection between the tubular members for leaks. Additional annular seal means are carried by the body between the spaced seal means with passage means for conducting fluid pressure to move the additional seal means radially of the body and into the opening to seal against the connection and isolate one end of the connection from the other end with additional passage means in the body for communicating with the isolated ends of the connection for selectively externally testing the ends of the connection for leaks.

Still another object of the invention is to provide an external leak tester for tubular members which are connected by a connection including a body having an opening extending longitudinally therethrough for receiving the tubular members and connection therein, therebeing spacer means mounted in the body opening forming annular recesses spaced longitudinally within the body opening and annular seal means mounted in the recesses. Fluid passage means are provided in the body for communicating with the seal means to urge them into sealing engagement in the recesses and simultaneously radially of the body opening for sealably engaging the connection on the tubular members therebetween. The seal means comprises an annular elastomer body having surfaces extending toward the tubular members and back-up means on the surfaces for aiding in inhibiting extrusion of the elastomer when it is urged radially of the body opening to sealingly engage the tubular members.

Another object of the invention is to provide a method for externally testing a connection between tubular members by positioning the connection between spaced annular seal means and applying fluid pressure to the seal means to move the spaced seal means radially to seal off the connection and form a chamber between the seal means. Fluid is injected into the chamber to a pressure significantly greater than the internal pressure in the connection and any fluid inflow is instrumentally noted. The connection may be tested by initially making it up to engage an internal seal without engaging an external connection seal. Thereafter, the seal means are released and the connection is made up to full recommended torque and again tested. If the connection is leak proof, the seals are retracted and the tubular members may be lowered through the test until into the well bore. If the test is initially conducted with the connection fully made up, the seals are retracted and the tubular members are run into the well bore, if the connection is leak free. If it leaks, the leak may be repaired, or the tubular members disconnected and replaced. In some instances the external test is conducted only after the initial seal has been established, and if it does not leak, the connection is released from between the seals, the connection fully made up and run into the well.

Another object of this invention is to provide an improved method and apparatus for externally testing tubular members in which longitudinally spaced annular seals may be moved radially inwardly and outwardly repetitively responsive to the supplying and withdrawing of a pressurized actuating fluid against the outer circumferential surface of such seals to form a closed chamber around the exterior of the tubular members between the seals of the body and such seals will, even after repetitive operation, completely and effectively form a sealing relationship against the tubular member which will repetitively withstand the high pressure differentials across the seals.

Other objects and advantages of the invention will become apparent from a consideration of the description and drawings.

BRIEF DESCRIPTION OF THE DRAWINGS

FIG. 3 is a longitudinal sectional view of another form of a leak tester of the present invention;

FIG. 4 is a sectional view on the line 4—4 of FIG. 2 and showing the relative position of the seal and back-up means both during nonsealing and sealing engagement with a tubular member;

FIG. 5 is a partial sectional view showing the leak tester of the present invention wherein the seal means is seated on the upset of a tubular member;

FIG. 6 illustrates the leak tester of the present invention wherein the seal means is seated on the tubular member adjacent the upset portion thereof;

FIG. 7 is an elevational view of one form of seal means usable with the present invention;

FIG. 8 is a sectional view on the line 8—8 of FIG. 7 to better illustrate the details of the seal means;

DESCRIPTION OF THE PREFERRED EMBODIMENTS

Figure 1:
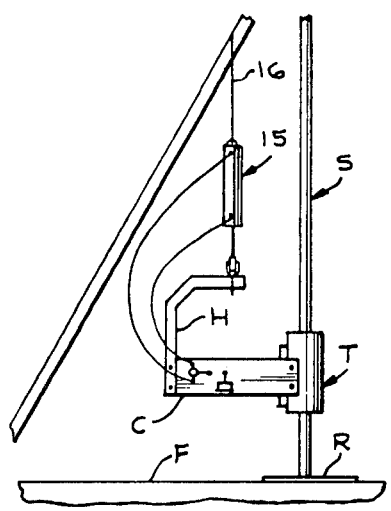
FIG. 1 is a schematic view illustrating the present invention supported on the floor of a well derrick or mast during the running of tubulars into a well bore.

In FIG. 1 a tubular well string is referred to generally by the letter S and the external leak tester of the present invention is referred to generally by the letter T and is shown as being supported for receiving the well string S longitudinally therethrough as shown in FIG. 1. Such support arrangement includes a housing or cabinet C adapted to house an air actuated hydraulic pump and means for supplying fluid to actuate the seals and for supplying fluid to externally test the connection in the external tester. The housing is connected to the hanger H that is supported by means of the double acting hydraulic cylinder referred to generally at 15 which hydraulic cylinder is suspended from a suitable means such as a cable 16 to position the tester T at a desired position adjacent the rotary table R in the well floor F to enable the well string pipe S to be moved longitudinally through the tester T and sequentially tested at each connection and then lowered into the well bore.

It can be appreciated that the present invention may be employed as a quality control check at a mill, as well as on site testing, or for rack testing at any location. It may also be used to test flow lines, pipe lines and flow conduits generally.

Figure 2:
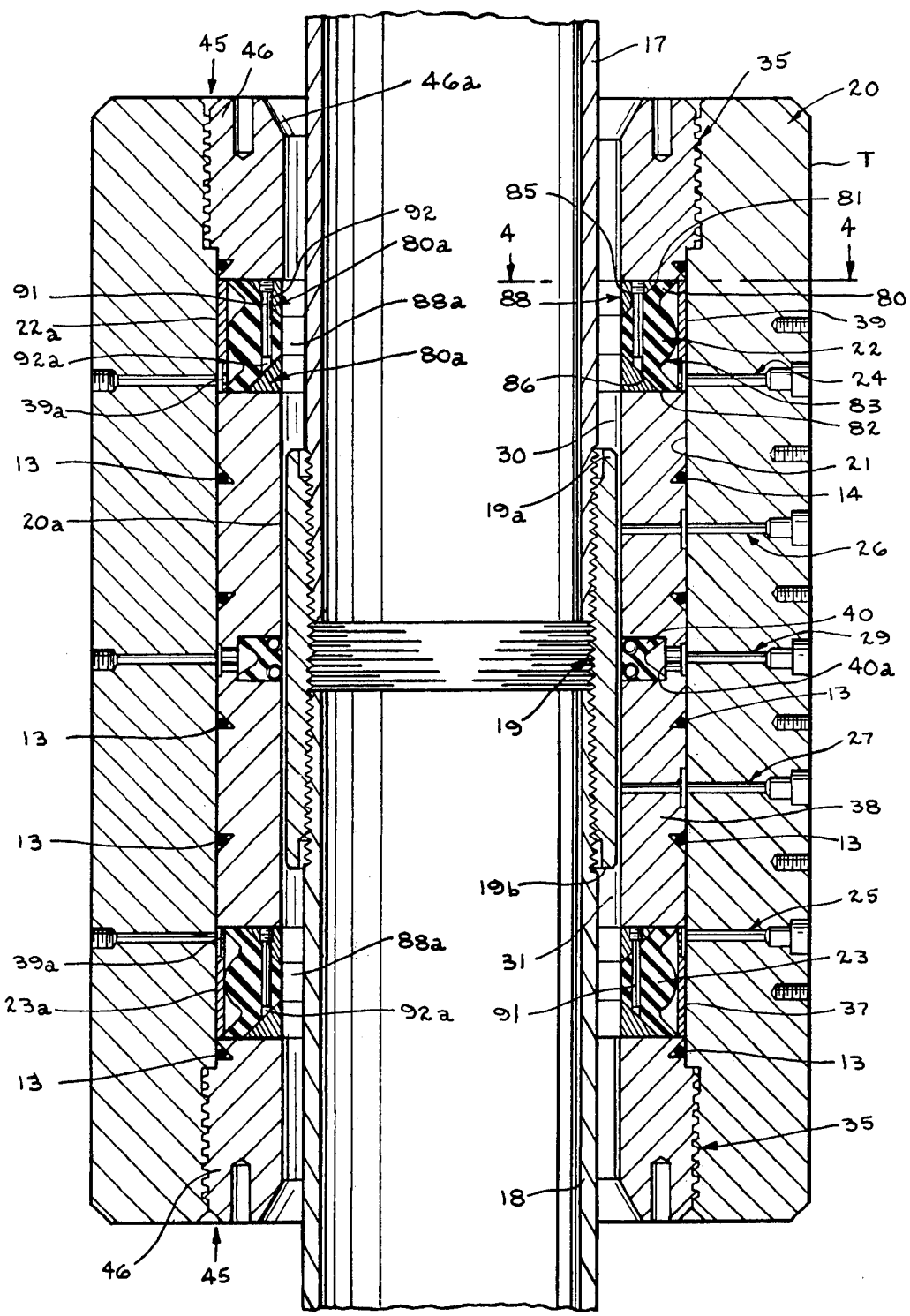
FIG. 2 is a longitudinal half sectional view of one form of the leak tester of the present invention.

In FIG. 2 the external tester T is shown as including a body referred to generally at 20 having an opening 21 extending longitudinally therethrough. The first and second annular seal means 22 and 23 are spaced longitudinally within the body opening 21 and are mounted in the body so that when fluid under pressure is supplied through the passage means 24 and 25 in the body 20 and through openings 39a in spacer 39 such seal means are urged into sealing engagement with the body and are moved radially of the body and the body opening 21 into sealing engagement with the tubular members 17 and 18 that are connected together by means of the connection referred to generally at 19. As illustrated in FIG. 2, the connection 19 is in the form of a collar, which threadedly engages each end of the members 17 and 18 as shown. Such connection may be a weld or any other type of connection.

It is desirable that the annular seal means 22 and 23 when actuated by fluid pressure engage the tubular members 17 and 18 so as to seal off the coupling or connection 19 therebetween and form a chamber 20a between the seals. As shown in the drawings, the clearance between the coupling and chamber in the tester is maintained at a minimum so as to require a minimum volume of test fluid, whether hydraulic or pneumatic, thus increasing the sensitivity or accuracy of the tester.

This is accomplished by providing only a slight clearance for the coupling as it passes through the tester as shown in the drawings. Thus the opening in the body through which the connection and tubular members are received is only slightly larger in diameter than the connection to be tested.

Since the diameter of the chamber substantially throughout its extent between the seals is only slightly larger in diameter than the connection, the volume of the chamber is not substantially nor significantly greater than the volume defined by the external diameter of the connection and the tubular members within the chamber. The test chamber volume is defined by the difference in volume between the chamber formed between the seals and the volume of the tubular members and connection within the chamber, and since the chamber volume preferably generally approximates the volume of the connection and tubular members retained between the seals, this increases the sensitivity of the tests. Also, fluid pressure in the test chamber will not act to increase the test chamber volume so as to affect the sensitivity or accuracy of the tests. Suitable fluid pressure may then be communicated through the passage means referred to generally at 26 and 27 to a pressure significantly greater than the pressure internally of the connection 19 to externally test the threaded connection between the tubular members 17 and 18 and coupling for leaks by detecting any fluid inflow to the interior of the coupling.

The body 20 of the tester T is shown in FIG. 2 as including additional annular seal means 40 for engaging the coupling forming the connection 19 in FIG. 2 of the drawings between the seal means 22 and 23. Additional fluid passage means referred to generally at 29 are provided in the body for communicating on one side of the additional seal means 40 to urge it radially outwardly to engage the coupling so as to isolate the end 19a of the coupling from the end 19b of the coupling and to separate chamber 20a into chambers 30 and 31.

If the pressure in the chamber 20a between seals 22 and 23 falls or reduces to indicate a leak, then additional seal means 40 is actuated to engage coupling 19. Thereafter, the connection 19 may be selectively externally leak tested to determine which end of the coupling may be leaking by instrumentally determining any pressure decay or fall off as a result of fluid inflow into the connection ends from the chamber 30 formed between the seal means 22 and the seal means 40 or from the chamber 31 formed between the seal means 23 and the seal means 40. Such pressure decay or fall off from either chamber to the interior of the tubular members 17 and 18 through the connection 19 may be noted visually or by any suitable instrument means such as a gage as will be noted in greater detail hereinafter.

The longitudinally extending body opening 21 is shown in FIG. 2 as being provided with connecting means 35 adjacent each end, such connecting means being shown as comprising threads. The body 20 includes a plurality of spacer means 37, 38 and 39 being ring shaped members having longitudinal openings therethrough and are adapted to be positioned within the longitudinally extending body opening 21 as shown and cooperate to form annular recesses 22a, 23a and 40a for receiving and positioning the seal means 22 and 23 in proper longitudinal spaced relationship in body 20 for receiving and sealing the connection 19 therebetween.

The annular recesses 22a, 23a and 40a in the body 20 enable the seal means 22, 23 and 40 to move freely radially relative to the body so as to sealingly engage with the tubular member 17 and 18 and to retract into their respective annular recesses when pressure is withdrawn or released from each of the seal means. The construction and arrangement of the seals and the manner of actuating them by fluid pressure enables the present invention to sealingly engage tubular members which may have some defect that would prevent proper sealing engagement by other types of sealing arrangements of the prior art.

Locking means referred to generally at 45 in FIG. 2 are provided in the form of threaded rings 46 for threadedly engaging with the threads comprising the connecting means 35 to engage and retain the spacer means and seal means in position as illustrated within the body opening 21.

Figure 9:
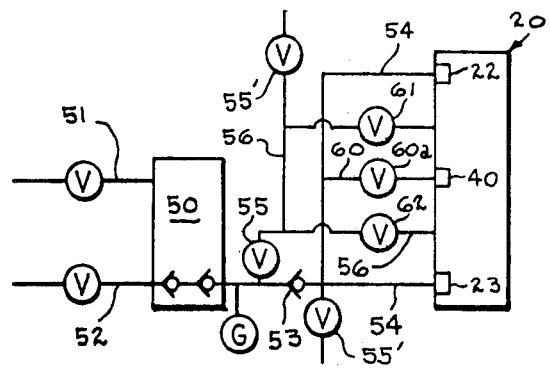
FIG. 9 is a diagrammatic view illustrating a test arrangement for use with the present invention.

It can be appreciated that various size openings in the spacer means may be provided to accommodate connected tubular members of various diameter within a predetermined range. When employing the tester of the present invention a suitable air or gas and fluid source, which fluid for purposes of illustration will be described as water, will ordinarily be available at the rig site. As shown in FIG. 9, an air actuated pump 50 is connected to a conduit 51 for supplying air to the air actuated hydraulic pump 50 whereupon fluid, such as water may be pumped through the pump and through the check valve means 53 in the line 54 to supply fluid to act behind or on one side of each of the seals 22 and 23. The fluid pressure sealingly engages the seals in their respective grooves as the seals simultaneously move radially to sealingly engage the tubular members. After the seals have been set, the valves 55 and 62 are opened whereupon pressure is conducted through the conduit 56 to the chamber 20a defined between the seal means 22 and 23 sealingly engaging the tubular members 17 and 18 on each side of the coupling shown in FIG. 2. The check valve 53 retains the pressure on seals 22 and 23 and the pressure in chamber 20a may be any amount desired up to collapse pressure rating of the connection and tubular members.

The conduits 54, 56 communicate with a gage designated G and when the valves 55, 62 in the conduit 56 are opened after the seals 22 and 23 have been set and chamber 20a between seals 22, 23 subjected to the desired fluid pressure, any pressure fall off in the chamber 20a defined between the seals 22 and 23 is instrumentally noted by gage G. This indicates a fluid inflow from such chamber to the interior of members 17 and 18 and a leak in connection 19. Thereafter the valve 60a may be opened and fluid pressure conducted through the conduit 60 to act on the seal 40 to engage such seal with the connection and isolate the coupling end 19a from the coupling end 19b shown in FIG. 2. Thereafter by selectively actuating the valves 61 and 62, it can be determined which or if both of the coupling ends are leaking by noting pressure fall off on gage G when valves 61 and 62 are opened one at a time to selectively communicate the chambers adjacent the coupling ends 19a, 19b with gage G. During the foregoing, valves 55' are closed and after the test is completed pressure on the seals and in the chambers is bled off by opening either of valves 55'.

Figure 11:
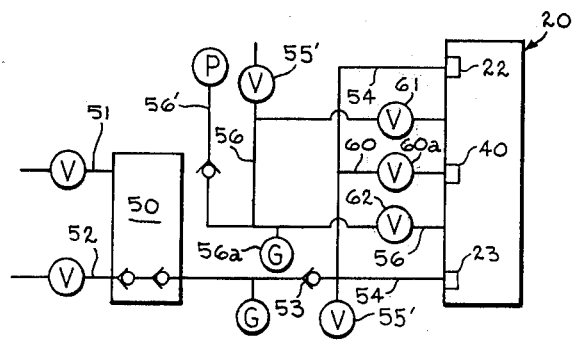
FIG. 11 is a diagrammatic view illustrating an alternate test arrangement with the present invention.

If it is desired to set seals 22, 23 and 40 with hydraulic pressure and test a joint or connection with pneumatic pressure such as nitrogen or the like, the arrangement of FIG. 11 may be employed. It is similar to FIG. 9, but a separate source for pneumatic pressure is pump P which discharges to the test chamber through lines 56' and 56 with any fall off due to leakage in the joint being registered by gage 56a in line 56.

When the test is completed hydraulic seal pressure may be bled through valve 55' and pneumatic chamber test pressure bled through valve 55' in line 56.

Figure 10:
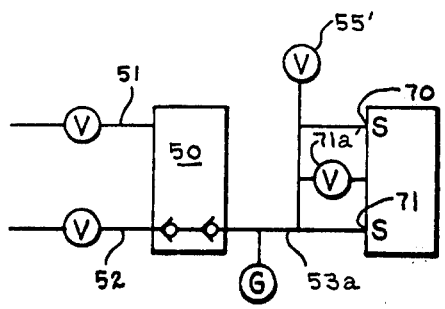
FIG. 10 is a schematic diagram illustrating the use of the form of the invention shown in FIG. 3 for testing tubulars.

A pneumatic source may be supplied to the test chamber in the FIG. 10 system by disconnecting valve 71a' from the hydraulic system and connecting it to communicate with a pump source P as in FIG. 11. The hydraulic lines may be employed to set seals 70 and 71, or the seals 22, 23 (as the case may be). A gage 56a in the pneumatic line could be employed to detect joint leakage. The valve 55' in FIG. 10 may be opened to bleed pressure from the seals and similar valve in the pneumatic line may be opened to bleed the test chamber when the test is completed.

FIG. 2 illustrates a non-upset coupling type coupling connection, and in FIG. 3 a tester T suitable for use with what may be termed a premium joint such as that referred to as a "HYDRIL" or an "ATLAS BRADFORD" connection is shown. A schematic illustration of the latter is illustrated, however it can be appreciated that the present invention will function equally well on any type of premium connection. In this form of the invention the tester T again includes an annular body 20 with a longitudinally extending body opening 21 therethrough. One end of the opening 21 is provided with an annular shoulder 65 as illustrated for receiving and seating spacer means 66 thereon. The spacer means 66 includes an annular lip 66a and spacer means 68 includes annular lip 68a and these spacers along with the spacer means 67 when properly positioned provide spaced annular recesses 70a and 71a for receiving the seal means referred to at 70 and 71. After the spacers and seal means have been positioned within the body, a threaded ring 46 may be threadedly engaged with the connecting means 35 shown again as being in the form of threads adjacent one end of the longitudinal opening 21. The spacers may be considered as forming part of the body 20, as in the FIG. 2 modification.

The tubular members 17a and 18b illustrated in FIG. 3 of the drawings are shown as having what is termed in the art an upset, and it will be noted that the seal means 70 and 71 seal on such upsets to isolate the connection therebetween.

After the tubular members have been positioned longitudinally in the opening, fluid pressure is supplied through the passage means 72 and 73 to move the seal means 70 and 71 radially of the body into sealing engagement with the upset portions of the tubular members 17a and 18b to isolate the connection therebetween and form a chamber 20a between seals 70 and 71. Thereafter external fluid pressure may be conducted through the passage means 74 between the seal means 72 and 73 to chamber 20a and the pressure increased to the desired amount to determine whether or not there is a leak in the connection between the tubular members 17a and 18b.

This arrangement is schematically illustrated in FIG. 10 wherein an air actuated hydraulic pump 50 is again represented. Air from line 51 actuates the pump and pumps fluid, which in this illustration is water from conduit 52 to line 53a to close seals 70 and 71. Thereafter valve 71a' may be opened to communicate test fluid to chamber 20a between seals 70 and 71. Any fall off of pressure in chamber 20a will be instrumentally measured on gage G. The pressure on the seals and in the chamber may be bled off through valve 55' when the test is completed.

In FIG. 5 the form of the invention as illustrated in FIG. 2 is shown as being employed with tubular members wherein the tubular member such as that shown at 18c is provided with an annular upset portion 18d and the connection 19 is shown as being in the form of a coupling 19a'. The seals engage the coupled, upset pipe of FIG. 5. In FIG. 6 the tubular member 18c is again shown and it will be noted that the seal means is shown as sealingly engaging the tubular member below the upset portion 18d.

In the FIG. 2 as well as in the FIG. 3 form of the invention, after the external pressure test has been conducted, pressure is relieved from the seals whereupon they withdraw radially away from the tubular members and enable the tubular members, regardless of the form of connection, to be moved longitudinally through the tester 20 and into the well bore.

The test of the present invention may be conducted when the connection is only partially made up. For example, the connection shown in FIG. 3 includes an internal and an external seal. The connection may be made up with only the internal seal engaged, and the seal means then radially moved to seal it off for test. The seals may then be released, the connection made up to full recommended torque and the seal means again radially moved to isolate the connection for an external test. If the joint leaks, it can be repaired or disconnected and replaced. In some instances, the joint will be tested when only the initial seal is established and if it does not leak, it is fully made up and run into the well bore.

After the test, the seals are withdrawn radially and the tubular members may be lowered into the well bore.

This same procedure may be applied on any connection, including the coupling 19 shown in FIG. 2.

It can be appreciated that the external pressure test conducted on the connection is conducted at relative high pressures (i.e. up to at least collapse pressure rating of the connection and tubular members if desired) and the seal means employed must be capable of withstanding such test pressures to maintain a seal to determine the integrity of the connection and also must be capable of withdrawing into the recesses so as to enable the tubular members to move therethrough of the connection. Ordinarily, the pressure internally of the connection will be approximately atmospheric.

Attention is directed to FIGS. 2 and 4 wherein one form of seal means is shown as including an annular elastomer body 80 having surfaces 81 and 82 which extend generally toward the tubular member to be sealingly engaged. A circumferential surface 83 extending therebetween is adapted to receive fluid pressure thereagainst and the surfaces 81 and 82 each include portions 85 and 86 which are inclined toward each other as shown better in FIG. 2. Thus, the annular inner edge portions 88a and 97a of the seal means of the present invention have a smaller cross-sectional area adjacent the tubular members they engage than the cross-sectional area of surface 83 or 97 against which the fluid pressure is applied as shown in the drawings. This increases the pressure per unit area where the seals engage the tubular members and creates a more effective seal.

The surface portions 85 and 86 have mounted thereon back-up means referred to generally at 80a and in FIG. 4 such back-up means is shown as comprising a plurality of arcuate or annular rigid segments 89 which are preferably generally triangular in cross section as shown in FIG. 2 of the drawings. The annular or arcuate segments 89 are each mounted on the surfaces 85 and 86 by any suitable means such as pins 90 and 91 which pins are secured to the segments by any suitable means such as threads thereon which engage with threads formed in openings 92 in the segments as shown in the drawings. Openings 92a are provided in the elastomer or seals to receive the pins and thus the segments 89 are arranged on the top and bottom circumferential edges of the body 80 adjacent the longitudinal opening therethrough. If desired the segments 89 on the surface portion 85 may be offset circumferentially from the segments 89 on the surface portion 86 to further inhibit extrusion of the elastomer seal. It will be noted that the pins and openings are provided in both the upper and lower rows of segments, but for simplicity in illustration the pins are shown only in the upper segments. When the elastomer body 80 is moved into sealing engagement with the tubular member, the segments 89 provide back-up and inhibit extrusion of the elastomer.

As shown in FIG. 4, the annular segments 89 are arranged on the body 80 in circumferential spaced relation when the seal is retracted into the recess, but as the fluid pressure moves the body 80 toward sealing engagement, the segments 89 contact as shown at their edges 89a. When the pressure on edge 83 is released, the elastomer returns to its original position in its recess.

The seal means 22 and 23 may assume that form as shown at 40 in FIG. 2. As shown in FIGS. 7 and 8 this seal form comprises an annular elastomer body 94 having upper and lower surfaces 95 and 96 which are substantially parallel and extending toward the connection or tubular member to be sealingly engaged. They are joined by a circumferential edge 97 extending therebetween against which fluid pressure may act. A pair of garter springs 98 and 99 are mounted in each of the surfaces 95, 96 at the juncture of the surfaces 95, 96 and the longitudinal opening in the seal which is the edge nearest the connection or tubular member to be sealingly engaged. The garter springs collapse when the seal is closed to aid in inhibiting extrusion of elastomer upon the application of pressure as shown in FIG. 7. Similarly such garter springs aid in returning the annular seal means to its withdrawn position relative to the tubular member or connection to which it is to be sealingly engaged so that such members may be moved longitudinally therethrough. As shown in FIG. 7, the coils of the garter springs are in their normal spaced relationship when the seal is "open" and are collapsed when the seal is "closed" about the connection.

The elastomer for the seals may be any suitable material and polyurethane has been found to work quite satisfactorily. It is of suitable hardness to withstand extrusion under pressure and resilient enough to return the seal into the recess when pressure is released. The circumferential edge 83 and the circumferential edge 97 of each form of seal means is provided with annular lips at its top and bottom surfaces as shown in the drawings so that when fluid pressure is exerted directly against such circumferential edge, the lips sealingly engage the recess as the seal simultaneously moves radially to sealingly engage the pipe. Also, each seal includes an annular portion 88a and 97a between the back-up means of reduced cross section as previously noted for sealingly engaging the pipe.

In the form of seal means shown at 22, 23, a substantial volume of polyurethane of enlargement is provided along edge 83 to aid in returning this seal form into the recess and to reduce the fluid volume required to actuate the seals.

It can be appreciated that suitable seal means as referred to at 13 in the drawings are provided between the body 20 and the annular spacer rings positioned in the opening 21 of such body and the threaded nuts so as to inhibit any loss of fluid pressure.

By applying pressure directly on the seal means adjacent one circumferential edge to move the seal means radially into sealing engagement, a number of objections of prior devices and methods is overcome by the present invention. Also, the present invention enables a much smaller volume of fluid to be employed to run the tests, so that the tests are more sensitive and accurate in uncovering leaks. It can be appreciated that the spacer means are provided with passage or port means to communicate fluid pressure to the seal means and the test chambers, as shown and described. The spacer means may be considered as part of the body means.

The configuration of the seal means enables the seal means to sealingly engage the recesses in which they are seated as such seal means moves radially to sealingly engage about the connection to be tested. Also since the size of test chamber can be determined by the inner diameter of the spacer means or by the body bore diameter is spacer means are not employed in the body, a test chamber of minimum volume in relation to the volume of the connection and tubular members may be provided thus providing a more sensitive and accurate test.

The seal means when in relaxed position are withdrawn from the body bore 21 into the body 20. As shown, they are illustrated as being flush with the bore through which the tubular members and connection are received; however they may be constructed so as to be retracted relative to the bore to prevent damage thereto as the connection and tubular members are moved through the tester T, or the tester T moved relative to the tubular member. Also, the reduced cross sectional area of the seal means at the sealing end adjacent the bore lessens the possibility of damage to the seals, and the back-up means provides further protection.

The present invention has been described wherein the pressure test is conducted by hydrostatic means; however, it can be appreciated that suitable gas pressure such as nitrogen or other compressible medium may be employed to set the seals and conduct the test in those circumstances where desired.

The foregoing disclosure and description of the invention are illustrative and explanatory thereof, and various changes in the size, shape, and materials as well as in the details of the illustrated construction may be made without departing from the spirit of the invention.

What is claimed is:

1. A testing apparatus for repetitively performing external tests for leaks in tubular members, such as, connections between two interconnected tubular members, comprising:

a body for encircling a selected length of tubular member including the portion of the tubular member to be tested for leaks, said body having a longitudinal opening through which the tubular member may extend;

the body having first and second annular grooves therein spaced longitudinally along said opening;

annular seal means mounted in each groove for inwardly and outwardly radial movements, each of the annular seal means comprising an annular elastomer body having an inner surface extending generally toward the tubular member to be sealingly engaged and having an outer circumferential surface for receiving fluid pressure, the inner surface including two opposing sloping surfaces which taper inwardly to a surface which physically engages the tubular member when the annular seal means is moved radially inwardly;

back-up means mounted in association with each annular seal means for inward and outward radial movement with such seal means, the back-up means for each annular seal means comprising a plurality of anti-extrusion elements mounted on the upper inner portion and on the lower inner portion of the annular seal means so as to be simultaneously movable therewith in a radial direction and so as to form a substantially circular ring on each of the upper inner portion and the lower inner portion of the annular seal means when the annular seal means and the back-up means engage the tubular member;

each of the plurality of anti-extrusion elements forming the back-up means having a first surface for extending toward the tubular member to be sealingly engaged and having a second sloping surface for engaging the sloping surface of the annular seal means which tapers inwardly toward the tubular member;

means associated with the body for supplying a pressurized actuating fluid directly against the outer circumferential surface of each of the annular seal means to force the annular seal means and its associated back-up means radially inwardly whereby the annular seal means and the back-up means sealingly engage the tubular member at a selected position, the spaced annular seal means and the body forming a closed chamber which seals off the exterior of the tubular member and the portion of the tubular member to be tested, and the sloping surfaces of the annular seal means and the sloping surfaces of the anti-extrusion elements of the back-up means coacting to urge the anti-extrusion elements into tighter frictional engagement with the tubular member upon the application of additional pressurized actuating fluid after the annular seal means have moved into sealing engagement with the tubular member;

means for supplying a pressurized test fluid into the closed chamber for externally testing the selected portion of the tubular member enclosed in the closed chamber; and means for measuring any decline of the pressure of the testing fluid occurring in the closed chamber, which decline is indicative of a leak in the tubular member.

2. As a subcombination in an external testing apparatus for externally testing a tubular member for leaks, such as, externally testing the connection between two tubular members, which external testing apparatus includes a body having a longitudinal opening through which the tubular member may extend, first and second annular grooves spaced therein longitudinally along the opening for receiving annular seal means, means associated with the body for supplying a pressurized actuating fluid directly against the outer circumferential surface of each of the annular seal means, means for supplying a pressurized test fluid into a closed chamber formed by the body and the spaced annular seal means, and means for measuring any decline in the pressure of the testing fluid occurring in the closed chamber, an improved pressure-actuated annular seal means, comprising:

an annular elastomer body having an inner surface extending generally toward the tubular member to be sealingly engaged and having an outer circumferential surface for receiving fluid pressure, the inner surface including two opposing sloping surfaces which taper inwardly to a surface which physically engages the tubular member when the annular seal means is moved radially inwardly;

back-up means mounted in association with each annular seal means for inward and outward radial movement with such seal means, the back-up means for each annular seal means comprising a plurality of anti-extrusion elements mounted on the upper inner portion and on the lower inner portion of the annular seal means so as to be simultaneously movable therewith in a radical direction and so as to form a substantially circular ring on each of the upper inner portion and the lower inner portion of the annular seal means when the annular seal means and the back-up means engage the tubular member; and each of the plurality of anti-extrusion elements forming the back-up means having a first surface for extending toward the tubular member to be sealingly engaged and having a second sloping surface for engaging the sloping surface of the annular seal means which tapers inwardly toward the tubular member whereby the sloping surfaces of the annular seal means and the sloping surfaces of the anti-extrusion elements of the back-up means coact to urge the anti-extrusion into tighter frictional engagement with the tubular member upon the application of additional pressurized actuating fluid after the annular seal means have moved into sealing engagement with the tubular member.

3. A method of externally testing a connection between two tubular members with an external testing apparatus having a body and radially movable annular seal means supported therein and in spaced relationship, each seal means having back-up means mounted on either side thereof and movable radially therewith, said method comprising the steps of:

positioning the connection within the body of the external testing apparatus to locate the same between the spaced seal means;

applying a pressurized actuating fluid to each of the annular seal means to move the annular seal means and the back-up means associated therewith radially inwardly to effect a sealing engagement between the annular seal means and the tubular members and to effect a frictional contact between the back-up means and the tubular members whereby the spaced annular seal means and the body form a closed chamber sealing off the exterior of the connection even though the outside diameters of the tubular members may be different at the points such tubular members are engaged by the annular seal means and also whereby said back-up means prevents significant extrusion of the annular seal means responsive to the pressures imposed thereon;

utilizing the pressurized actuating fluid acting radially upon the annular seal means to urge the back-up means into tighter frictional contact with the tubular members after the annular seal means have moved into sealing position;

injecting a pressurized test fluid into the closed chamber to externally test the connection between the two tubular members; and determining any fluid pressure decay from the closed chamber, such fluid pressure being indicative of a leak in the connection between the two tubular members.

* * * * *